US012631749B2

(12) United States Patent
Kato et al.

(10) Patent No.: US 12,631,749 B2
(45) Date of Patent: *May 19, 2026

(54) OPTICAL SENSOR

(71) Applicant: Murata Manufacturing Co., Ltd., Nagaokakyo (JP)

(72) Inventors: Takatoshi Kato, Nagaokakyo (JP); Hiroshi Watanabe, Nagaokakyo (JP); Kohei Sugahara, Nagaokakyo (JP); Yuta Aoki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1028 days.

This patent is subject to a terminal disclaimer.

(21) Appl. No.: 17/826,272

(22) Filed: May 27, 2022

(65) Prior Publication Data

US 2022/0283303 A1 Sep. 8, 2022

Related U.S. Application Data

(63) Continuation of application No. PCT/JP2020/035547, filed on Sep. 18, 2020.

(30) Foreign Application Priority Data

Dec. 3, 2019 (JP) ................................. 2019-218538

(51) Int. Cl.
*G01S 17/04* (2020.01)
*G01L 1/04* (2006.01)

(52) U.S. Cl.
CPC ................ *G01S 17/04* (2020.01); *G01L 1/04* (2013.01)

(58) Field of Classification Search
CPC ....... G01S 7/48–51; G01S 17/04; G01L 1/04; G01L 5/166; G06F 3/042; G06F 3/0421
See application file for complete search history.

(56) References Cited

U.S. PATENT DOCUMENTS 3,703,039 A 11/1972 Hard et al.
8,490,501 B2 7/2013 Koyama et al.
(Continued)

FOREIGN PATENT DOCUMENTS

CN 110456367 A 11/2019
EP 2034287 A1 3/2009
(Continued)

OTHER PUBLICATIONS

J. Konstantinova, A. Stilli and K. Althoefer, "Force and proximity fingertip sensor to enhance grasping perception," 2015 IEEE/RSJ International Conference on Intelligent Robots and Systems (IROS), Hamburg, Germany, 2015, pp. 2118-2123 (Year: 2015).*
(Continued)

*Primary Examiner* — Yuqing Xiao
*Assistant Examiner* — Sean C. Grant
(74) *Attorney, Agent, or Firm* — Keating & Bennett, LLP

(57) ABSTRACT

An optical sensor includes a first light source to emit light, a first photodetector to receive light and generate a signal representing a result of receiving the light, a cover made of an elastic material deformable in response to an external force and covering the first light source and the first photodetector, the cover including a reflective portion that reflects light and a transmissive portion that transmits light, a force detector to detect a force corresponding to deformation of the cover based on a signal from the first photodetector, the signal representing a result of receiving light emitted by the first light source, an optical assembly outside the covering component, and a proximity detector to detect the object being in proximity by using the optical assembly and one of the first light source and the first photodetector.

16 Claims, 10 Drawing Sheets

(56) References Cited

U.S. PATENT DOCUMENTS

| | | | | |
|---|---|---|---|---|
| 11,933,684 B2* | 3/2024 | Kato | .................. | G01S 7/4813 |
| 2010/0253650 A1* | 10/2010 | Dietzel | ............... | G06F 3/0414 |
| | | | | 73/800 |
| 2014/0326882 A1 | 11/2014 | Tar et al. | | |
| 2015/0177082 A1* | 6/2015 | Sawada | .................. | G01L 5/166 |
| | | | | 901/47 |
| 2019/0341518 A1 | 11/2019 | Chua et al. | | |

FOREIGN PATENT DOCUMENTS

| | | | |
|---|---|---|---|
| JP | 6062496 A | 4/1985 |
| JP | 2007071564 A | 3/2007 |
| JP | 2010539474 A | 12/2010 |
| JP | 5089774 B2 | 12/2012 |
| JP | 5825604 B2 | 12/2015 |
| TW | 200921071 A | 5/2009 |
| WO | 2009035324 A1 | 3/2009 |
| WO | 2014045685 A1 | 3/2014 |

OTHER PUBLICATIONS

Patel, Radhen, Rebecca Cox, and Nikolaus Correll. "Integrated proximity, contact and force sensing using elastomer-embedded commodity proximity sensors." Autonomous Robots 42.7 (2018): 1443-1458. (Year: 2018).*
International Search Report in PCT/JP2020/035547, mailed Dec. 15, 2020, 3 pages.
Written Opinion in PCT/JP2020/035547, mailed Dec. 15, 2020, 3 pages.

* cited by examiner

OPTICAL SENSOR

CROSS REFERENCE TO RELATED APPLICATIONS

This application claims the benefit of priority to Japanese Patent Application No. 2019-218538 filed on Dec. 3, 2019 and is a Continuation application of PCT Application No. PCT/JP2020/035547 filed on Sep. 18, 2020. The entire contents of each application are hereby incorporated herein by reference.

BACKGROUND OF THE INVENTION

1. Field of the Invention

The present invention relates to an optical sensor to optically detect an object in proximity to the optical sensor and a force exerted by contact with the object.

2. Description of the Related Art

In recent years, various sensors to be fitted to a device such as a robot hand have been proposed to enable various types of sensing such as detection of an object in proximity to the sensor or detection of contact with an object (see, for example, Japanese Patent No. 508977, Japanese Patent No. 5825604, and International Publication No. 2014/045685).

Japanese Patent No. 5089774 discloses a complex sensor that is appropriate for attachment to a fingertip surface of a robot hand for performing object-grasping operations and the like. The complex sensor disclosed in Japanese Patent No. 5089774 includes a touch sensor including a pressure-sensitive sheet and a proximity sensor that includes a reflective photosensor. The complex sensor disclosed in Japanese Patent No. 5089774 is formed by combining two sensors in such a manner that a detection surface of the proximity sensor is defined by the pressure-sensitive sheet.

Japanese Patent No. 5825604 discloses an optical touch sensor that enables a measurement of a 6-axis force. International Publication No. 2014/045685 discloses a force sensor configured to detect a shearing force by using a variable frame. In Japanese Patent No. 5825604 and International Publication No. 2014/045685, various kinds of sensing of a contact force exerted by an object is performed by using an optical mechanism based on deformation of an elastic body.

Performing proximity sensing along with contact-force sensing in the prior art unfortunately requires a large-scale device configuration including separate sensors or a complicated sensor mechanism based on a complicated detection principle.

SUMMARY OF THE INVENTION

Preferred embodiments of the present invention provide optical sensors that each enable, by using an optically simple mechanism, compatibility between detection of an object in proximity to the optical sensor and detection of a force exerted by contact with the object.

An optical sensor according to a preferred embodiment of the present invention is configured to detect a force exerted by contact with an object and detect the object being in proximity to the optical sensor based on a result of receiving light. The optical sensor includes a first light source to emit light, a first photodetector to receive light and generate a signal representing a result of receiving the light, a cover made of an elastic material deformable in response to an external force and covering the first light source and the first photodetector, the cover including a reflective portion that reflects light and a transmissive portion that transmits light, a force detector to detect a force corresponding to deformation of the cover based on a signal from the first photodetector, the signal representing a result of receiving light emitted by the first light source, an optical assembly outside the cover, and a proximity detector to detect the object being in proximity by using the optical assembly and one of the first light source and the first photodetector.

By using an optically simple mechanism, the optical sensors according to preferred embodiments of the present invention are each able to achieve compatibility between detection of an object in proximity and detection of a force exerted by contact with the object.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, optical sensors according to preferred embodiments of the present invention will be described with reference to the attached drawings.

The preferred embodiments are described for illustrative purposes and partial substitutions or combinations of configurations in different preferred embodiments are feasible. In a second and subsequent preferred embodiments, features common to a first preferred embodiment of the present invention will not be described and only different features will be described. In particular, the same or similar operations and the same or similar advantages achievable by the same or similar configurations will not individually be described in each of the preferred embodiments.

First Preferred Embodiment

1. Configuration

Figure 1:
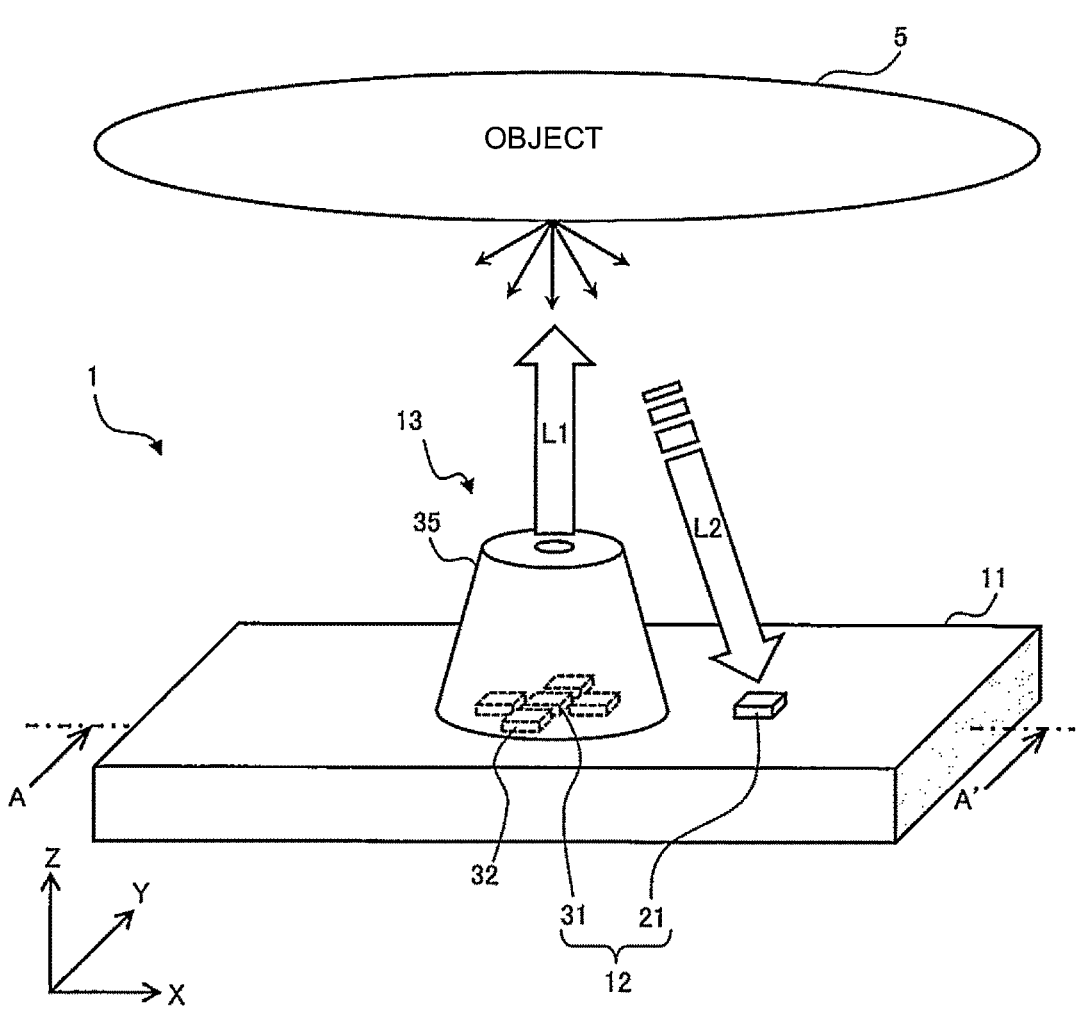
FIG. 1 is an illustration for providing an overview of an optical sensor according to a first preferred embodiment of the present invention.

A configuration of an optical sensor according to a first preferred embodiment of the present invention will be described with reference to FIGS. 1 to 3. FIG. 1 is an illustration for providing an overview of an optical sensor 1 according to the present preferred embodiment.

The optical sensor 1 according to the present preferred embodiment is a module based on an optical detection scheme, and the module includes a proximity sensor 12 and a force sensor 13 that are integrated into a single unit. The proximity sensor 12 is configured to detect an object 5 being in proximity, and the force sensor 13 is configured to detect a force exerted by contact with the object 5 (that is, a contact force). The optical sensor can be used to detect the object 5, which is an example of various objects to be grasped by a robot hand. The proximity sensor 12 and the force sensor 13 of the optical sensor 1 are able to continuously monitor a series of processes in which, for example, the object 5 approaches, comes into contact, and exerts a force.

The force sensor 13 of the optical sensor 1 includes a dome 35, a light source 31, and a photodetector 32, and the light source 31 and the photodetector 32 are disposed in the dome 35. The dome 35 is made of elastic materials that are deformable in response to an external force and that can be restored to the original shape. Examples of the external force include a contact force exerted by contact with the object 5. In the present preferred embodiment, the proximity sensor 12 includes a photodetector 21 disposed outside the dome 35 and the light source 31 shared with the force sensor 13. Detection light L1 emitted by the light source 31 is reflected by the object 5, and reflected light L2 is received by the photodetector 21. The proximity sensor 12 is configured to detect the object 5 being in proximity in this way.

In the present preferred embodiment, a portion of the configuration, such as the light source 31, is shared between the force sensor 13 and the proximity sensor 12, and thus an optically simple mechanism provides the optical sensor 1, which achieves compatibility between force detection and proximity detection. A configuration of the optical sensor 1 according to the present preferred embodiment will be described in detail below.

For example, the proximity sensor 12 and the force sensor 13 are mounted on a substrate 11, and the optical sensor 1 is provided. In the following description, two directions parallel or substantially parallel to the principal plane of the substrate are denoted as the X direction and the Y direction, and a direction normal to the principal plane is denoted as the Z direction. The space in which the force sensor 13 protrudes from the substrate 11 is defined as the positive Z side, which is sometimes referred to as the upper side, and the opposite side is defined as the negative Z side, which is sometimes referred to as the lower side.

The dome 35 in the optical sensor 1 is an example of a cover, which covers the light source 31 and the photodetector 32 in the force sensor unit 13. In the dome 35, for example, the light source 31 is disposed on the substrate 11 so as to emit the detection light L1 in the upper direction. Further, the photodetector 32 is disposed on the substrate 11 so as to surround the light source 31.

In FIG. 1, a circular or substantially circular truncated cone is illustrated as an example of the shape of the dome 35. The shape of the dome 35 is not limited to a particular shape and may be, for example, a cylinder, a hemisphere, or a spheroid. In addition, examples of the elastic material of which the dome 35 is made may include various kinds of resin materials, rubber materials, and metal materials, for example.

Figure 2:
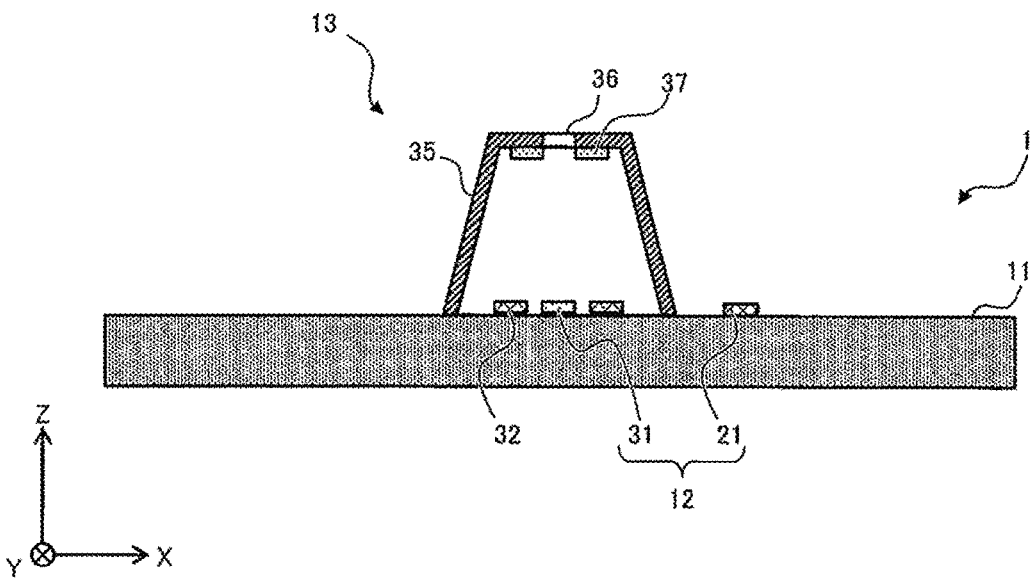
FIG. 2 is a cross-sectional view of the optical sensor according to the first preferred embodiment of the present invention.

FIG. 2 is a cross-sectional view of the optical sensor 1 shown in FIG. 1 taken along the line A-A'. In the force sensor 13 in the optical sensor 1, the dome 35 includes an optical window 36 and a reflector 37. The optical window 36 is disposed so as to pass a portion of the detection light L1, which is emitted by the light source 31, and the reflector 37 is disposed so as to reflect a portion of the detection light L1, which is emitted by the light source 31. The optical window 36 is disposed, for example, at an upper position of the dome 35 so as to face the light source 31. The reflector 37 is disposed, for example, on an inner surface of the dome 35 so as to surround the optical window 36.

For example, the dome 35 includes a component such as a shadow mask to block light incident on the entire or substantially the entire outer surface, except the optical window 36. In this way, external light coming from the environment and causing disturbances can be prevented from entering the dome 35. The interior of the dome 35 may be hollow or filled with a substance such as, for example, an elastic material or a liquid that is formed of a material such as a resin having transparency. The transparency of the dome 35 is such that, for example, light in a wavelength band that includes the detection light L1 emitted by the light source 31 passes through the interior. For example, multiple resin layers may be disposed in the dome 35.

The optical window 36 is an example of a transmissive portion of the dome 35 according to the present preferred embodiment. The optical window 36 may be formed, for example, by physically making an opening in the component such as a shadow mask of the dome 35 or by filling the opening with material having transparency. The optical window 36 may be made of a transmissive film having transparency.

The reflector 37 is an example of a reflective portion of the dome 35 according to the present preferred embodiment. The reflector 37 is made of, for example, a material having optical characteristics of diffusely reflecting at least a portion of light in the wavelength band that includes the detection light L1 emitted by the light source 31. The reflector 37 may have optical characteristics to specularly reflect at least a portion of the light mentioned above. The reflector 37 is made of, for example, a reflective resin or a metal.

The photodetector 21 in the proximity sensor 12 is disposed on the substrate 11 near the dome 35 in the force sensor 13 so that a photosensitive surface, which receives light, faces upward. The proximity sensor 12 and the force sensor 13 may be arranged so that the optical sensor 1 has a threshold distance. The threshold distance is defined as a distance at which the reflected light L2 of the detection light L1, which is emitted by the light source 31, becomes blocked by the dome 35 in the force sensor 13 and the reflected light L2 stops reaching the photosensitive surface of the photodetector 21. The photodetector 21 in the proximity sensor 12 is an example of an optical unit disposed outside the dome 35 in the present preferred embodiment.

Figure 3:
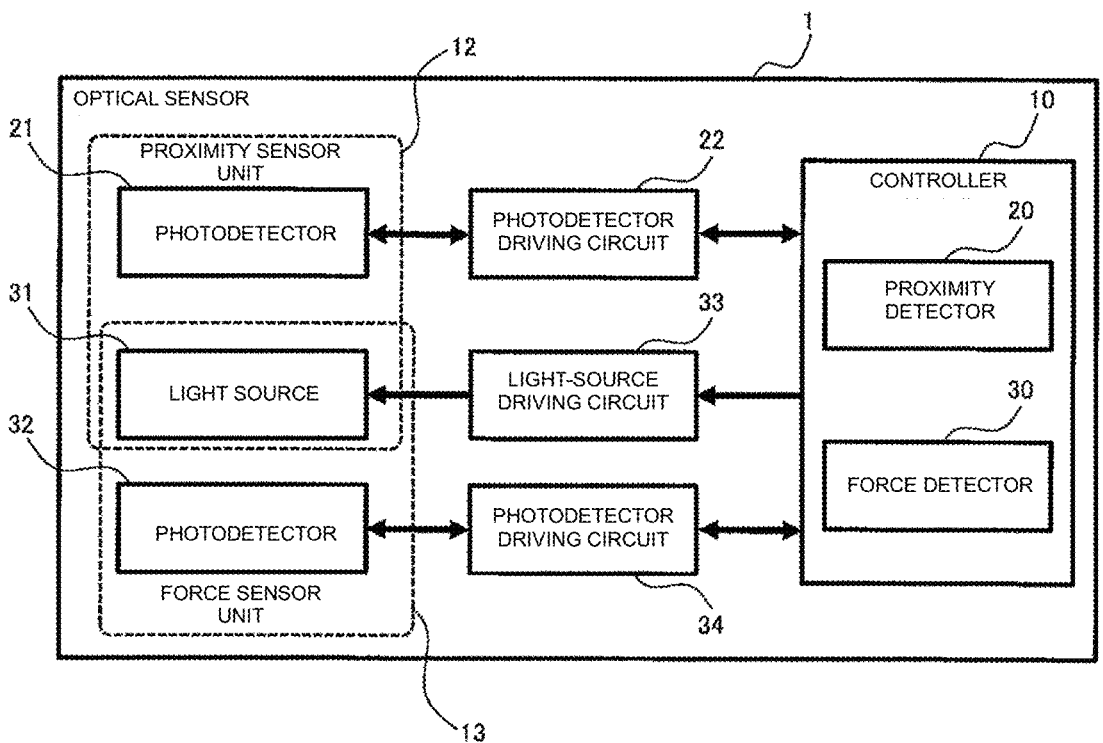
FIG. 3 is a block diagram of the optical sensor according to the first preferred embodiment of the present invention.

FIG. 3 is a block diagram depicting a configuration of the optical sensor 1 according to the present preferred embodiment. The optical sensor 1 according to the present preferred embodiment includes the proximity sensor 12, the force sensor 13, a light-source driving circuit 33, photodetector driving circuits 22 and 34, and a controller 10.

Examples of the light source 31 in the proximity sensor 12 and the force sensor 13 include a light emitting element such as a vertical cavity surface emitting laser (VCSEL) including a single emitter or multiple emitters. For example, the light source 31 is configured to emit light in a predetermined wavelength band such as an infrared region and output the detection light L1.

Examples of the light source 31 include not only a VCSEL but also various solid-state light emitting elements such as a laser diode (LD) or an LED. The light source 31 may include multiple light emitting elements. The light source 31 may include an optical system such as a lens and a mirror to collimate light from a light emitting element.

The light-source driving circuit 33 is configured to supply the light source 31 with a drive signal to emit the detection light L1. The light-source driving circuit 33 may include a modulator, for example, for AM modulation. For example, the light-source driving circuit 33 may modulate the detection light L1 at a specific modulation frequency in the range of approximately 10 Hz to approximately 1 MHz, at which an amplitude of light is periodically varied. Modulation of the detection light L1 enables the detection light L1 and the reflected light L2 of the detection light L1 to be easily distinguished from external light causing disturbance.

The photodetector 21 in the proximity sensor 12 includes one or more photosensitive elements such as a photodiode (PD) and includes a photosensitive surface including the one or more photosensitive elements. The photodetector 21 is configured to receive light such as the reflected light L2 of the detection light L1 on the photosensitive surface and generate a receive signal representing, for example, the intensity of the received light as a result of receiving light.

Examples of the photodetector 21 include not only a PD but also various photosensitive elements such as a phototransistor, a position sensitive detector (PSD), a complementary metal oxide semiconductor (CMOS) image sensor (CIS), or a charge-coupled device (CCD). The photodetector 21 may be positioned in a linear array or a two-dimensional array of photosensitive elements. A component such as a band-pass filter may be disposed on the photosensitive surface of the photodetector 21 to block light in a wavelength band that differs from the wavelength band including the detection light L1. In this way, an effect of external light causing disturbance can be avoided.

The photodetector driving circuit 22 includes a circuit configuration to drive the photodetector 21, such as an amplifier to amplify a receive signal that is output from the photodetector 21. The photodetector driving circuit 22 may perform signal processing such as extracting the intensity of the reflected light L2 from a result of receiving a signal.

The photodetector driving circuit 22 may perform, for example, filtering processing such as band-pass filtering to pass a signal component having the modulation frequency of the detection light L1 or may perform synchronous detection in synchronization with the light-source driving circuit 33. For example, the photodetector driving circuit 22 can isolate the reflected light L2 from external light causing disturbance and analyze the reflected light L2 by blocking a DC component, which is stationary. The modulation frequency of the detection light L1 can be set to an appropriate value, which differs from frequencies used by existing external systems, such as, for example, approximately 38 kHz, which is used as a carrier frequency for infrared remote control. In this way, malfunctioning of the optical sensor 1 because of an external system can be prevented.

For example, similarly to the photodetector 21 in the proximity sensor 12, the photodetector 32 in the force sensor 13 may include various photosensitive elements such as a PD and may be configured to generate a receive signal representing a result of receiving light. The photodetector 32 in the force sensor 13 includes, for example, three or more photosensitive elements and includes, for example, four photosensitive elements. In the example shown in FIG. 1, the photosensitive elements of the photodetector 32 are placed at four positions, that is, on both sides of the light source 31 in the X direction and in the Y direction.

The photodetector driving circuit 34 is configured, for example, similarly to the photodetector driving circuit 22, which is configured to drive the photodetector 21 in the proximity sensor unit 12, and configured to drive the photodetector 32 in the force sensor 13. Similarly to the photodetector driving circuit 22, the photodetector driving circuit 34 for the force sensor 13 may perform signal processing such as, for example, filtering processing on a receive signal from the photodetector 32 in the force sensor 13.

The controller 10 is configured to, for example, control overall operation of the optical sensor 1. The controller 10 includes, for example, a microcomputer and is configured to provide predetermined functions in cooperation with software. The controller 10 includes internal memories such as a ROM and a RAM, for example, and is configured to provide various functions by reading data and programs stored in the ROM, loading the data and the programs onto the RAM, and executing various kinds of computing processing.

For example, the controller 10 includes a proximity detector 20 and a force detector 30. The proximity detector 20 is configured to, based on a receive signal that is input via the photodetector driving circuit 22 for the proximity sensor 12, perform various kinds of computing processing to measure a distance to the object 5 and the variation in the distance. The measurement is based on the intensity of light received by the photodetector 21 in the proximity sensor unit 12.

The force detector 30 is configured to, based on a receive signal that is input via the photodetector driving circuit 34 for the force sensor unit 13, perform various kinds of computing processing to measure, for example, a multi-axis force such as a three-axis force or a six-axis force. Appropriate techniques known in the art can be used to measure a force (see, for example, Japanese Patent No. 5825604 and International Publication No. 2014/045685). For example, the force detector 30 is configured to divide the photosensitive elements included in the photodetector 32 into groups for handling and calculate such a parameter as a difference between receive signals included in each group to measure a three-axis force.

The controller 10 may be a hardware circuit such as, for example, a dedicated electronic circuit or a reconfigurable electronic circuit, which is designed to provide predetermined functions. The controller 10 may include various semiconductor integrated circuits such as a CPU, an MPU, a DSP, an FPGA, and an ASIC, for example. One of the proximity detector 20 and the force detector 30 or both of the proximity detector 20 and the force detector 30 may be provided separately from the controller 10. For example, the function of the proximity detector 20 may be built into the photodetector driving circuit 22, or the function of the force detector 30 may be built into the photodetector driving circuit 34.

In addition, the controller 10 may be configured to individually control start/stop of operation of each unit in the optical sensor 1 and control, for example, electric power supplied to each unit. The optical sensor 1 may be driven by electric power supplied from an external power supply or may have a built-in power supply such as a battery, for example.

The configuration is described above for illustrative purposes, and the configuration of the optical sensor 1 is not limited to the above configuration. For example, the optical sensor 1 according to the present preferred embodiment may include a unit such as the controller 10 separately from the optical sensor 1, and the optical sensor 1 may be provided as a module separate from the controller 10.

2. Operation

Operation of the optical sensor 1 configured as above will be described herein.

2-1. Overview of Operation

An overview of operation of the optical sensor 1 according to the present preferred embodiment will be described with reference to FIGS. 4A to 5B.

In the optical sensor 1 according to the present preferred embodiment, the light-source driving circuit 33 is controlled by the controller 10 and causes the light source 31 to emit the detection light L1. The light source 31 emits the detection light L1, for example, toward the optical window 36. The detection light L1, which passes through the optical window 36 of the dome 35, is incident on the object 5 and is reflected, for example, diffusely in accordance with the reflection coefficient of the object 5.

Figure 4A:
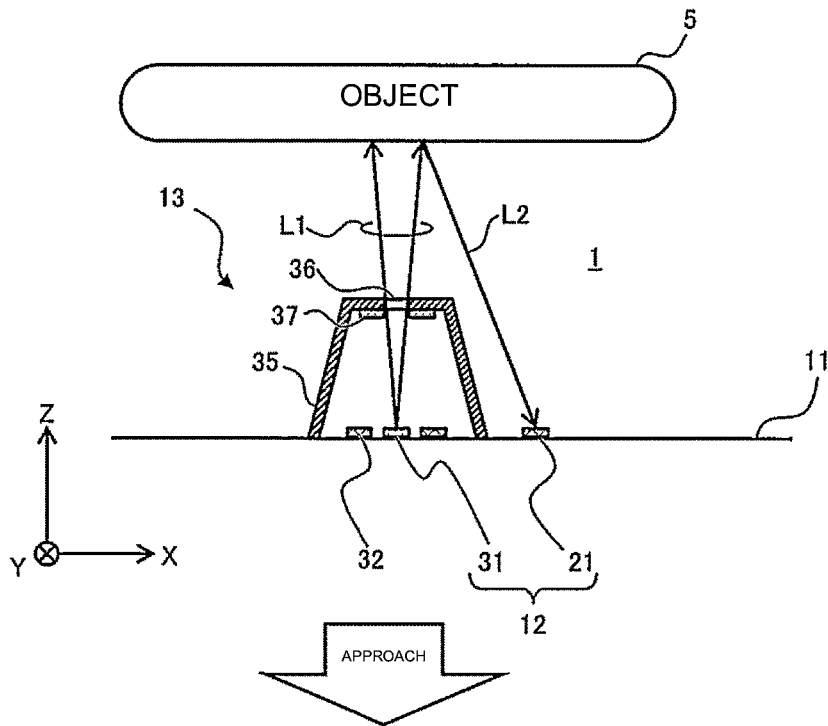
FIGS. 4A and 4B are illustrations for describing operation of proximity detection by the optical sensor according to the first preferred embodiment of the present invention.
Figure 4B:
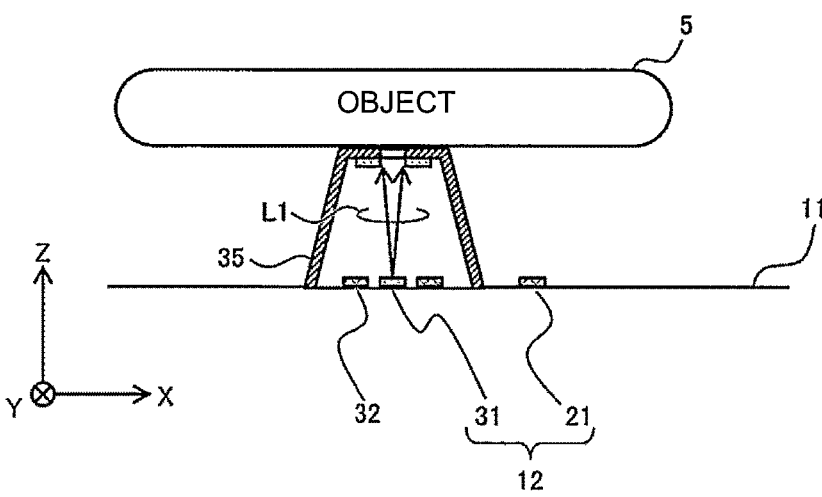

FIG. 4A illustrates the object 5 being located separate from the optical sensor 1. FIG. 4B illustrates the object 5 being in contact with the optical sensor 1 after the object 5 approaches from the position shown in FIG. 4A.

In the example shown in FIG. 4A, the detection light L1 is reflected on the object 5, and the reflected light L2 is incident on the photodetector 21. In the optical sensor 1, the proximity detector 20 performs signal processing for proximity detection based on a result obtained by the photodetector 21 by receiving light. Since the intensity of the reflected light L2 received by the photodetector 21 depends on the distance to the object 5, the signal processing for proximity detection can be performed by using various calculations to estimate the distance to the object 5 based on the receive signal.

Figure 5A:
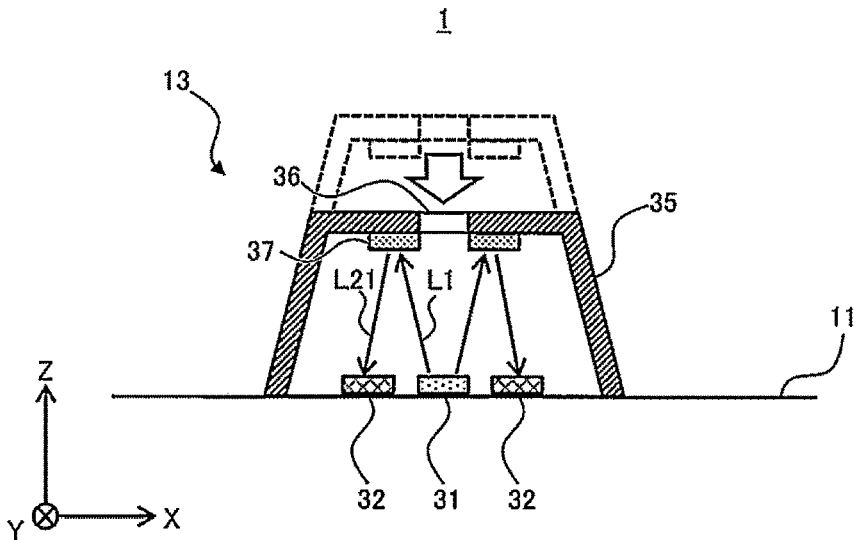
FIGS. 5A and 5B are illustrations for describing operation of force detection by the optical sensor.
Figure 5B:
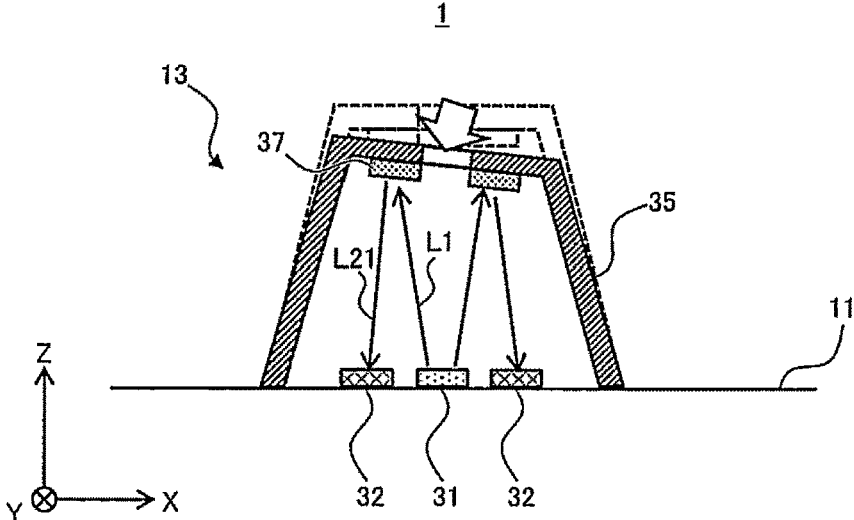

Further, for example, as shown in FIG. 4B, if the object 5 comes into contact with the force sensor unit 13, the object 5 exerts a force depending on the degree of contact. FIG. 5A illustrates a force being exerted on the force sensor unit 13 in the Z direction. FIG. 5B illustrates a force being exerted in a direction that differs from the direction shown in FIG. 5A.

In the force sensor 13, the light source 31 emits the detection light L1, and a portion of the detection light L1 is reflected by the reflector 37. The photodetector 32 receives reflected light L21 obtained by reflection of the detection light L1 on the reflector 37. When a force is exerted on the force sensor 13, how the dome 35 is deformed depends on how the force is exerted, as illustrated in FIGS. 5A and 5B. When the shape of the dome 35 changes, the condition of the reflector 37, such as the position and the direction, changes, and the direction or the angle in which the detection light L1 is reflected by the reflector 37 changes. The force detector 30 performs signal processing for force detection in which a force such as, for example, a three-axis force is measured based on a result obtained by the photodetector 32 by receiving light, the result changing in response to the deformation of the dome 35.

The operation described above enables the optical sensor 1 according to the present preferred embodiment to continuously monitor a series of processes in which the object 5 approaches and exerts a contact force. Operation details of the optical sensor 1 will be described herein.

2-2. Operation Details

The optical sensor 1 according to the present preferred embodiment is fitted to a component such as, for example, a robot hand of various kinds of robots. After the control system of a robot fitted with the optical sensor 1 recognizes the presence of the object 5, the optical sensor 1 starts to operate. An example of operation of the optical sensor 1 in such a case will be described with reference to FIG. 6.

Figure 6:
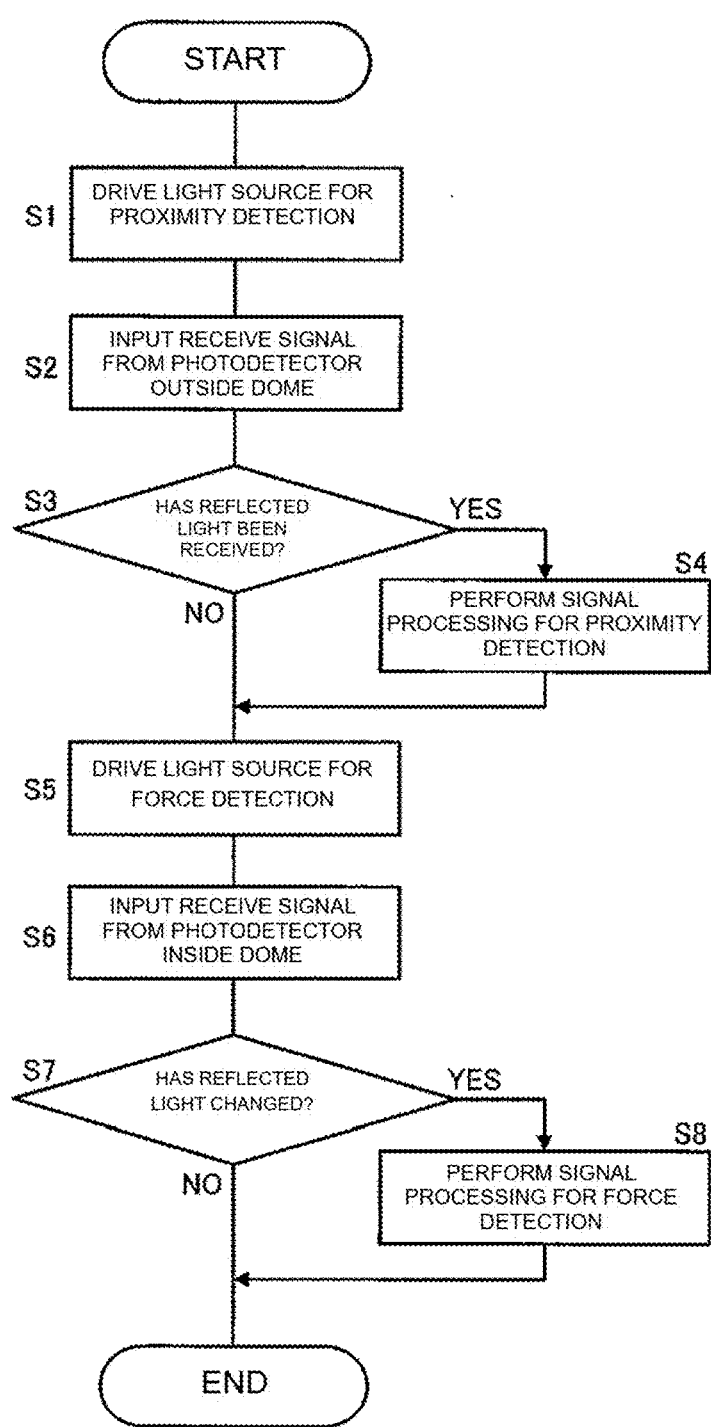
FIG. 6 is a flowchart for illustrating operation of the optical sensor according to the first preferred embodiment of the present invention.

FIG. 6 is a flowchart for illustrating operation of the optical sensor 1 according to the present preferred embodiment. For example, the processes in the flowchart in FIG. 6 are started in the above condition and repeatedly performed at regular intervals. Each process in the flowchart is performed, for example, by the controller 10 of the optical sensor 1 defining and functioning as the proximity detector 20 (steps S1 to S4) and the force detector 30 (steps S5 to S8).

First, the controller 10 of the optical sensor 1 controls the light-source driving circuit 33 so that the light source 31 emits the detection light L1 for proximity detection (step S1). In response to the control by the controller 10, the light-source driving circuit 33 generates a drive signal and supplies the drive signal to the light source 31. In step S1, for example, the light source 31 outputs a light pulse having a relatively high intensity as the detection light L1. Since the detection light L1 has a high intensity, the reflected light L2 having a detectable intensity can be obtained after the detection light L1 is incident on the object 5 located at a relatively large distance.

In addition, the controller 10 defining and functioning as the proximity detector 20 receives a receive signal from the photodetector 21 outside the dome 35 via the photodetector driving circuit 22 (step S2) in synchronization with the drive of the light source 31 for proximity detection (step S1). The reflected light L2, which is obtained by reflection of the detection light L1 on the object 5, is incident on the photodetector 21 together with, for example, external light causing disturbance.

Based on the receive signal that has been input, the controller 10 defining and functioning as the proximity detector 20 determines whether the photodetector 21 outside the dome 35 has received the reflected light L2 of the detection light L1 emitted by the light source 31 (step S3). For example, the controller 10 subtracts a signal level of a receive signal observed at a time when the detection light L1 is not emitted from a signal level of a receive signal observed at a time when a light pulse is output as the detection light L1 and compares the calculated signal level with a predetermined threshold. The threshold is set to, for example, approximately "0". Using receive signals synchronized with the timing of emission/non-emission of the detection light L1 enables the reflected light L2 of the detection light L1 to be distinguished from external light causing disturbance, and whether the reflected light L2 has been received can be determined.

If it is determined that the photodetector 21 outside the dome 35 has received the reflected light L2 (YES in step S3), the controller 10 serving as the proximity detector 20 performs signal processing for proximity detection to detect, based on the receive signal that has been obtained from the photodetector 21 in step S2, a parameter such as a distance to an object at which the reflected light L2 originates (step S4). In this case, since the object 5 at which the reflected light L2 originates is expected to be located close to and separate from the optical sensor 1 (refer to FIG. 4A), a distance to the object 5 can be detected by the signal processing in step S4.

The signal processing in step S4 may be performed by using information obtained in chronological order, and the information may include data obtained in step S2 in a previous cycle. While performing the processes in steps S3 and S4, for example, the controller 10 controls the light-source driving circuit 33 so that the light source 31 stops emission. For example, the controller 10 proceeds to step S5 thereafter.

In contrast, if it is determined that the photodetector 21 outside the dome 35 has not received the reflected light L2 (NO in step S3), the object 5 is expected to be in contact with the optical sensor 1 or nearly in contact (refer to FIG. 4B). Thus, if a negative determination is made in step S3, for example, the controller 10 does not perform signal processing for proximity detection (step S4) and proceeds to step S5.

Next, the controller 10 controls the light-source driving circuit 33 so that the light source 31 emits the detection light L1 for force detection (step S5). In step S5, for example, the light source 31 emits the detection light L1 with a smaller intensity than for proximity detection (step S1). In this way, saturation of the photodetector 32 can be avoided because the intensity of the reflected light L21 of the detection light L1 is not excessive in the dome 35. The intensity of the detection light L1 may be the same in steps S1 and S5.

In addition, for example, the controller 10 defining and functioning as the force detector 30 receives a receive signal from the photodetector 32 in the dome 35 via the photodetector driving circuit 34 (step S6) while the light source 31 is being driven for force detection (step S5).

Based on the receive signal that has been input, the controller 10 defining and functioning as the force detector 30 determines whether the result obtained by the photodetector 32 in the dome 35 by receiving light has changed from a predetermined result (step S7). The predetermined result is set in advance, for example, to a result obtained by the photodetector 32, which receives the reflected light L21 in response to the detection light L1 emitted by the light source 31 for force detection while the dome 35 is not deformed.

If it is determined that the result obtained by the photodetector 32 in the dome 35 by receiving light has changed (YES in step S7), the controller 10 defining and functioning as the force detector 30 performs signal processing for force detection to detect, for example, a three-axis force based on the receive signal that has been obtained from the photodetector 32 in the dome 35 in step S6 (step S8). In this case, since the dome 35 is expected to be deformed because of contact with the object 5, a contact force due to the object 5 can be detected by signal processing in step S8 (refer to FIGS. 5A and 5B).

The signal processing in step S8 may be performed by using information obtained in chronological order, and the information may include data obtained in step S6 in a previous cycle. While performing the processes in steps S7 and S8, for example, the controller 10 controls the light-source driving circuit 33 so that the light source 31 stops emission. For example, the controller 10 finishes the processes in the flowchart thereafter.

In contrast, if it is determined that the result obtained by the photodetector 32 in the dome 35 by receiving light has not changed (NO in step S7), for example, the controller 10 does not perform signal processing for force detection (step S8) and finishes the processes in the flowchart. Once finishing the processes in the flowchart, the controller 10 repeats the processes in the flowchart, for example, at predetermined intervals.

In the processes described above, while the light source 31 is driven for proximity detection and force detection (steps S1 and S5), the photodetector 32 in the dome 35 and the photodetector 21 outside the dome 35 are used to achieve compatibility between detection of the object 5 being in proximity and detection of a contact force due to the object 5.

In steps S1 to S4 described above, the output of the detection light L1 for proximity detection may be modulated to cope with disturbances by external light. For example, the controller 10 may cause the light-source driving circuit 33 to drive the light source 31 so that the output emission of the detection light L1 is repeatedly turned on and off for modulation at a predetermined frequency (step S1). In this case, whether the reflected light L2 of the detection light L1 is received can be detected by using a band-pass filter designed to selectively pass the frequency at which the detection light L1 is modulated (step S3).

3 Summarization

As described above, the optical sensor 1 according to the present preferred embodiment is configured to detect a force exerted by contact with an object, such as the object 5, and detect the object being in proximity based on a result of receiving light. The optical sensor 1 includes the light source 31, which is an example of a first light source, the photodetector 32, which is an example of a first photodetector, the dome 35, which is an example of a cover, the force detector 30, the photodetector 21, which is an example of an optical unit, and the proximity detector 20. The light source 31 is configured to emit light such as the detection light L1. The photodetector 32 is configured to receive light such as the reflected light L21 of the detection light L1 and generate a receive signal, which is a signal representing a result of receiving light. The dome 35 is made of an elastic material deformable in response to an external force, includes the reflector 37 as a reflective portion that reflects light and the optical window 36 as a transmissive portion that transmits light, and covers the light source 31 and the photodetector 32. The force detector 30 is configured to detect a force corresponding to deformation of the dome 35 based on a receive signal from the photodetector 32 in response to the light emitted by the light source 31. The optical unit such as the photodetector 21 is disposed outside the dome 35. The proximity detector 20 is configured to detect the object 5 being in proximity by using the optical unit and one of the light source 31 and the photodetector 32.

In the optical sensor 1, which is described above, a portion of the configuration, such as the light source 31, is shared for the detection of the object 5 being in proximity and the detection of a force exerted by the object 5, and an optically simple mechanism can achieve compatibility between proximity detection and force detection of an object such as the object 5.

In the present preferred embodiment, the optical unit that is located outside the dome 35 and that defines the proximity sensor 12 includes the photodetector 21, which is an example of a second photodetector configured to receive light and generate a receive signal representing a result of receiving light. The proximity detector 20 is configured to detect the object 5 being in proximity based on a receive signal from the photodetector 21 in response to light emitted by the light source 31. In this way, the proximity detector 20 can detect the object 5 being in proximity by using the light source 31 in the dome 35 and the photodetector 21 outside the dome 35.

In the present preferred embodiment, an intensity of light emitted by the light source 31 is higher when the photodetector 21 generates a receive signal representing a result of receiving light emitted by the light source 31 (step S1) than when the photodetector 32 generates a receive signal representing a result of receiving light emitted by the light source 31 (step S5). In this way, saturation of the photodetector 32 can be avoided during force detection while a sufficient intensity of light to be received by the photodetector 21 is maintained for proximity detection.

Second Preferred Embodiment

In a second preferred embodiment of the present invention, an optical sensor in which a photodetector is shared between a proximity sensor and a force sensor will be described with reference to FIGS. 7 to 9.

Figure 7:
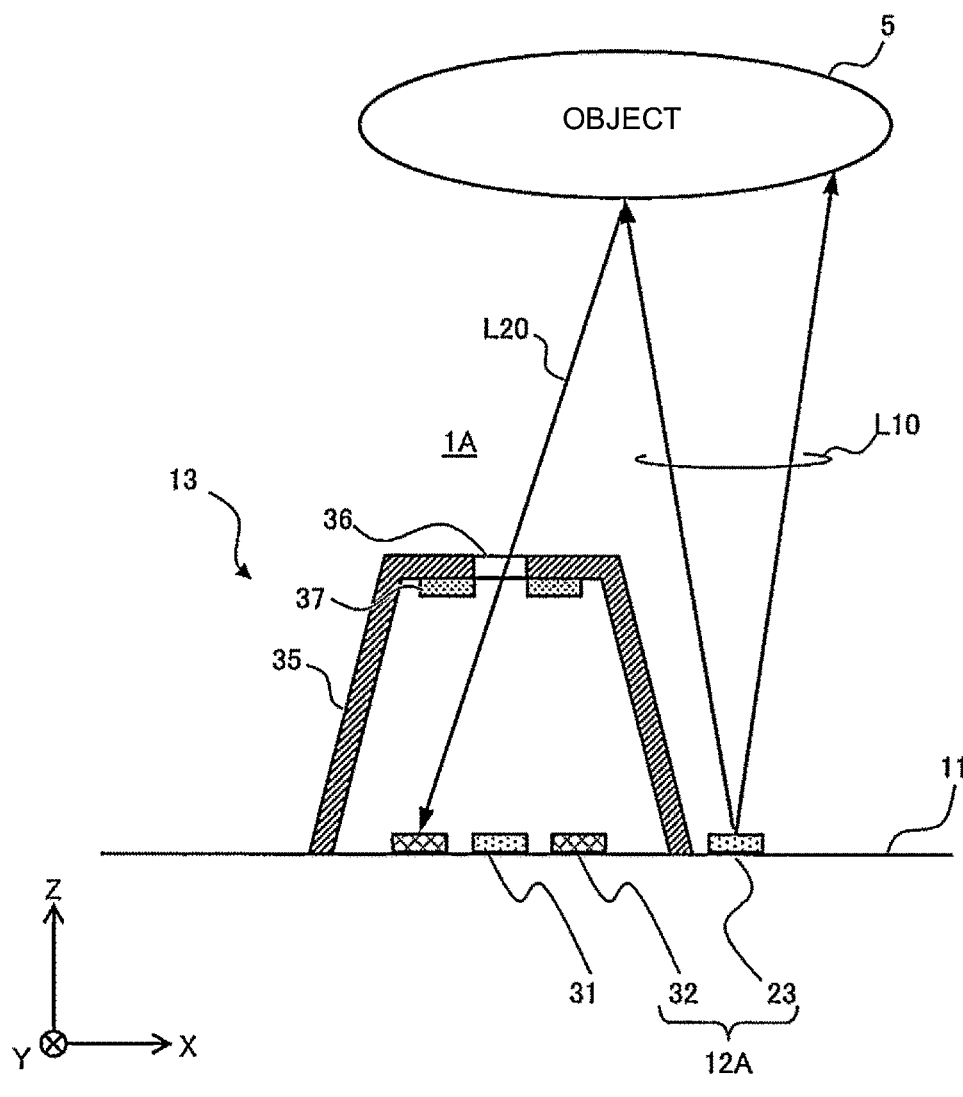
FIG. 7 is an illustration for providing an overview of an optical sensor according to a second preferred embodiment of the present invention.

FIG. 7 is an illustration for describing an optical sensor 1A according to the second preferred embodiment. The optical sensor 1A according to the present preferred embodiment has a configuration similar to the configuration described in the first preferred embodiment (refer to FIG. 1) except that a light source 23 is included instead of the photodetector 21 outside the dome 35. A proximity sensor 12A in the optical sensor 1A according to the present preferred embodiment includes the light source 23 outside the dome 35 and the photodetector 32 shared with the force sensor 13. The light source 31 in the force sensor 13 is not shared with the proximity sensor 12A in the present preferred embodiment.

Figure 8:
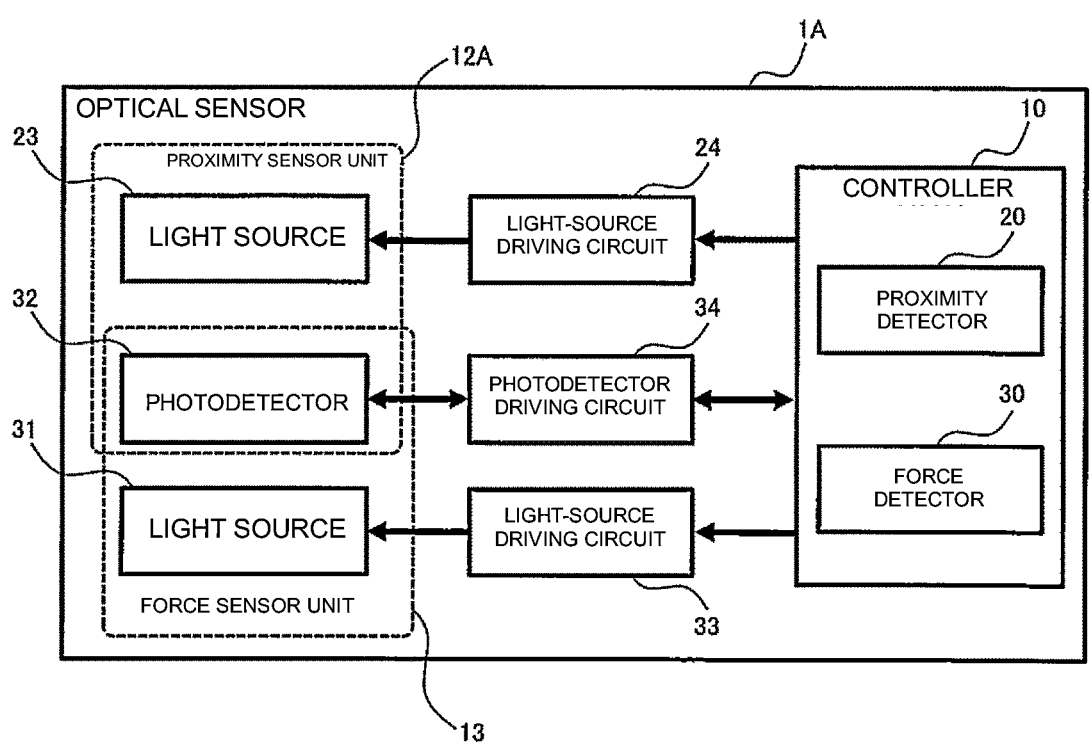
FIG. 8 is a block diagram of the optical sensor according to the second preferred embodiment of the present invention.

FIG. 8 is a block diagram of a configuration of the optical sensor 1A according to the present preferred embodiment. The optical sensor 1A according to the present preferred embodiment has a configuration similar to the configuration depicted in FIG. 3 except that the light source 23 in the proximity sensor 12A and a light-source driving circuit 24 are included, instead of the photodetector 21 and the photodetector driving circuit 22. For example, similarly to the light source 31 in the force sensor 13, the light source 23 in the proximity sensor 12A is a device such as a VCSEL. The light-source driving circuit 24 for the proximity sensor 12A is configured, for example, similarly to the light-source driving circuit 33 for the force sensor unit 13.

For example, as shown in FIG. 7, the light source 23 in the proximity sensor 12A is disposed on the substrate 11 so as to emit detection light L10 upward to detect the object 5 being in proximity. In the optical sensor 1A according to the present preferred embodiment, the proximity sensor 12A and the force sensor 13 are arranged so that reflected light L20 obtained by reflection of the detection light L10 on the object 5 passes through the optical window 36 and is incident on the photodetector 32 in the dome 35 when a distance to the object 5 is in a range defined for proximity detection. The light source 23 in the proximity sensor 12A is an example of an optical unit in the present preferred embodiment.

Figure 9:
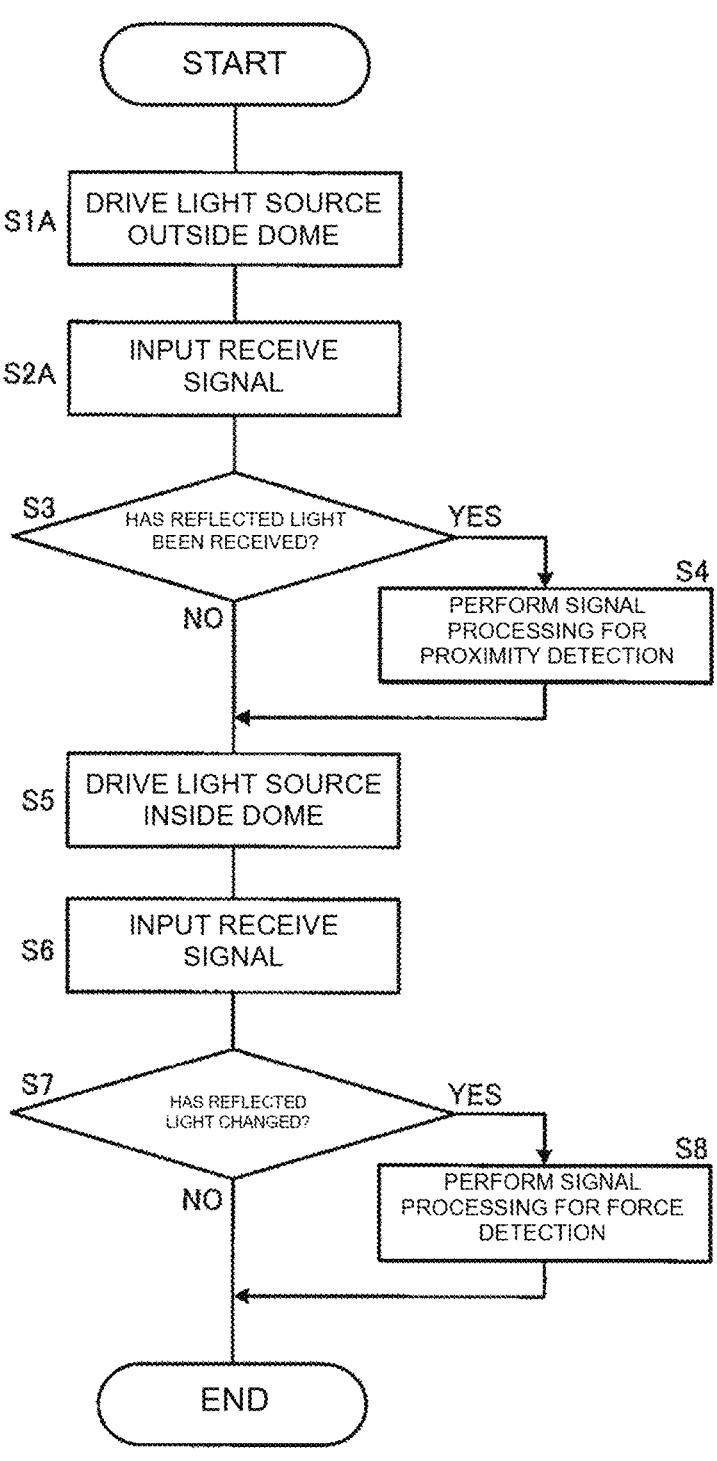
FIG. 9 is a flowchart for illustrating operation of the optical sensor according to the second preferred embodiment of the present invention.

FIG. 9 is a flowchart for illustrating operation of the optical sensor 1A according to the present preferred embodiment. In an operation similar to the operation shown in FIG. 6, the optical sensor 1A according to the present preferred embodiment drives the light source 23 outside the dome 35

(step S1A), instead of the light source 31, which is driven for proximity detection in step S1 in the first preferred embodiment.

The controller 10 causes the light source 23 outside the dome 35 to emit the detection light L10 (step S1A), and the proximity detector 20 receives a receive signal from the photodetector 32 in the dome 35 (step S2A). In this way, as in the first preferred embodiment, proximity detection (steps S3 and S4) can be performed based on the reflected light L20 from the object 5. The processes for force detection, steps S5 to S8, are also performed by using the light source 31 and the photodetector 32 in the dome 35 as in the first preferred embodiment.

In the processes described above, while the light source 23 outside the dome 35 and the light source 31 in the dome 35 are driven (steps S1A and S5), the photodetector 32 is shared for proximity detection and force detection (steps S2A and S6), and compatibility between detection of the object 5 being in proximity and detection of a contact force due to the object 5 is achieved.

In the processes described above, the controller 10 controls the light-source driving circuits 24 and 33 so that the light source 31 in the dome 35 stops operating while the light source 23 outside the dome 35 is operating (step S1A) and that the light source 23 outside the dome 35 stops operating while the light source 31 in the dome 35 is operating (step S5). In this way, power consumption in the optical sensor 1A can be reduced. As in the first preferred embodiment, the light sources 23 and 31 are stopped in steps S3, S4, S7, and S8.

As described above, in the present preferred embodiment, the optical unit that is located outside the dome 35 and that defines the proximity sensor 12A includes the light source 23, which is an example of a second light source configured to emit light such as the detection light L10. The proximity detector 20 is configured to detect the object 5 being in proximity based on a receive signal from the photodetector 32 in response to the light emitted by the light source 23. In this way, the proximity detector 20 can detect the object 5 being in proximity by using the photodetector 32 in the dome 35 and the light source 23 outside the dome 35. As in the first preferred embodiment, an optically simple mechanism in the present preferred embodiment can also achieve compatibility between proximity detection and force detection of an object such as the object 5.

In the present preferred embodiment, an intensity of light emitted by the light source 23 is higher than an intensity of light emitted by the light source 31 (steps S1A and S5). In this way, saturation of the photodetector 32 can also be avoided during force detection while a sufficient intensity of light to be received by the photodetector 32 is maintained for proximity detection.

Other Preferred Embodiments

Modifications to the first and second preferred embodiments of the present invention will be described with reference to FIGS. 10 and 11.

Figure 10:
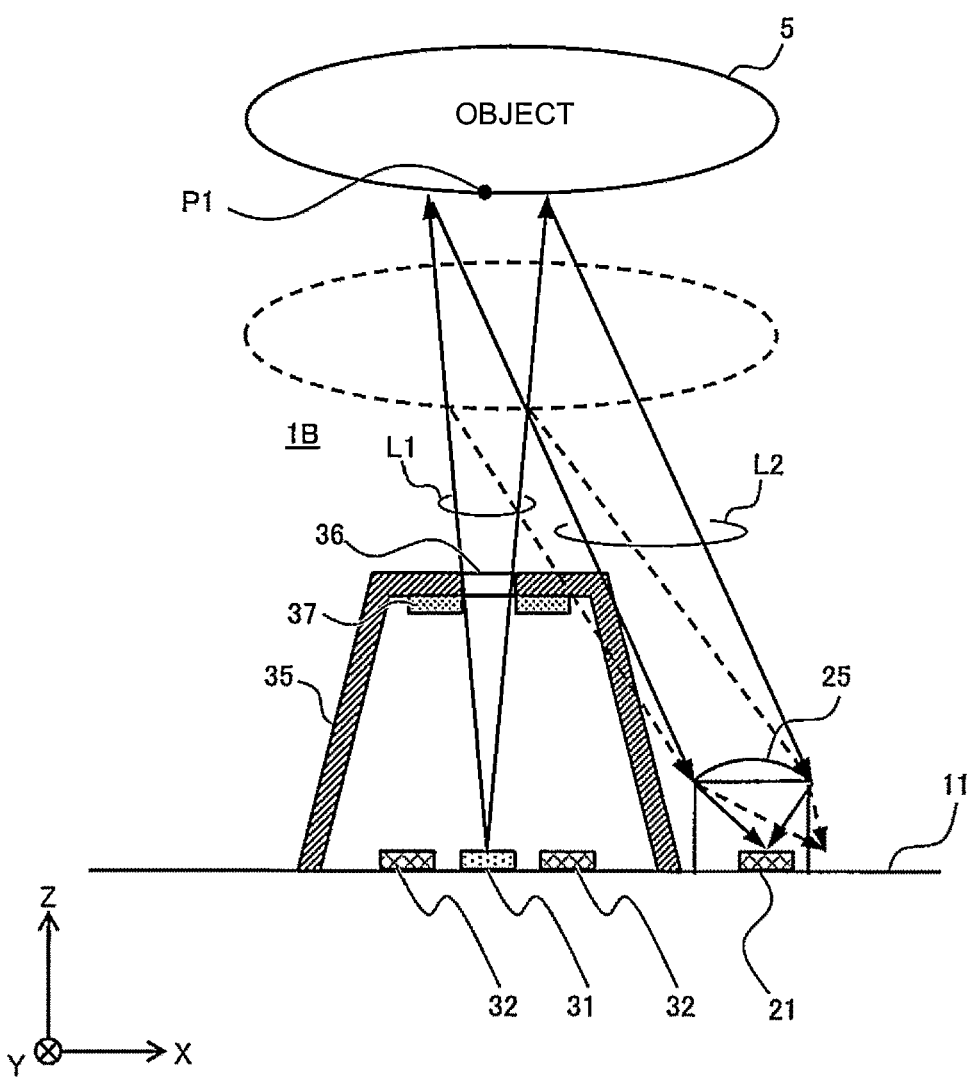
FIG. 10 is an illustration of a modification to the optical sensor according to the first preferred embodiment of the present invention.

FIG. 10 illustrates a configuration of an optical sensor 1B according to a modification to the first preferred embodiment. In addition to a configuration the same as or similar to the configuration described in the first preferred embodiment, the optical sensor 1B according to the present modification further includes an optical system 25 such as, for example, a lens configured to guide light incident on the photodetector 21 outside the dome 35. For example, the optical system 25 is disposed so as to focus on the photodetector 21 light incident from a specific position P1 determined in advance.

As shown in FIG. 10, since the optical system 25 is disposed in the optical sensor 1B according to the present modification, the reflected light L2, which is obtained by reflection of the detection light L1 on the object 5, is received by the photodetector 21 when the object 5 is located at the specific position P1. In contrast, when the object 5 is not located at the specific position P1, the reflected light L2, which is obtained by reflection of the detection light L1 on the object 5, is not received by the photodetector 21. The proximity detector 20 according to the present modification is configured to detect whether the object 5 is located at the specific position P1 based on a receive signal from the photodetector 21 representing a result of receiving light. Such detection can accurately be performed without depending on a parameter such as, for example, a reflection coefficient of the object 5.

As described above, in addition to the photodetector 21, the optical unit outside the dome 35 in the optical sensor 1B according to the present modification further includes the optical system 25 configured to guide light incident on the photodetector 21 from the specific position P1. The proximity detector 20 is configured to detect whether the object 5 is located at the specific position P1 based on the receive signal from the photodetector 21. Such proximity detection can accurately be performed without depending on a parameter such as a reflection coefficient of the object 5.

Figure 11:
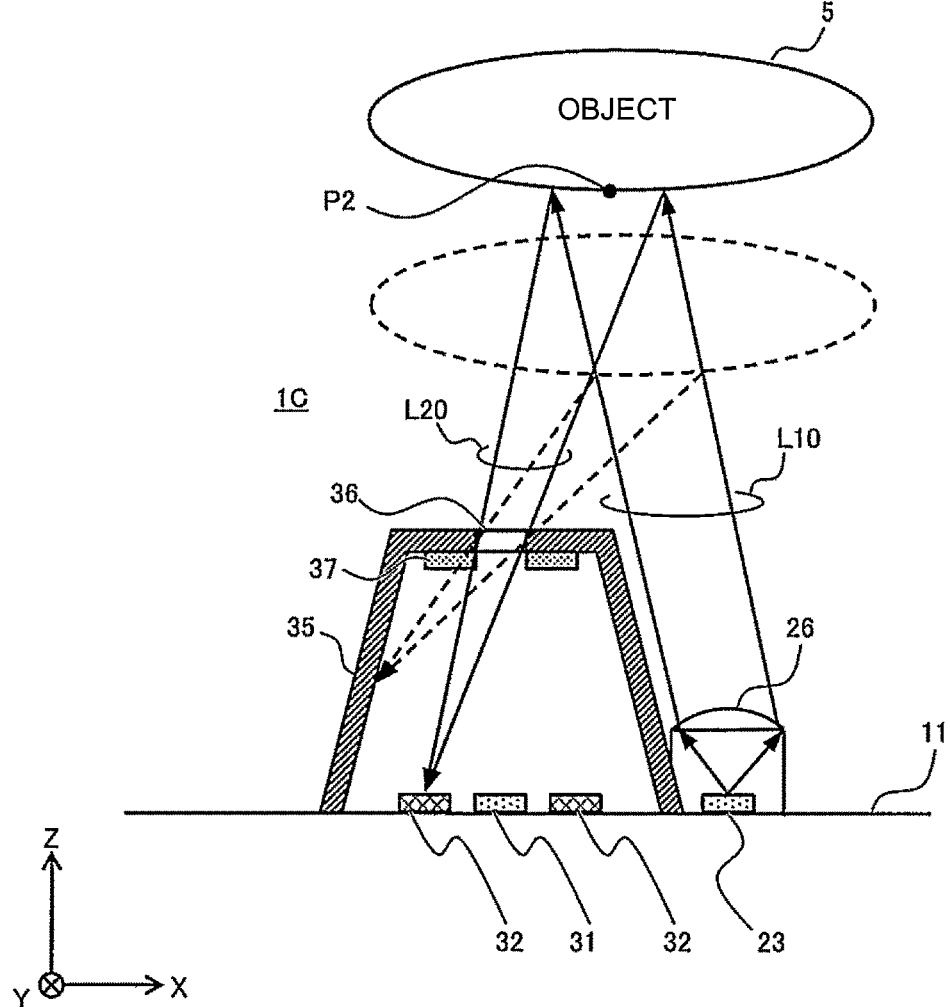
FIG. 11 is an illustration of a modification to the optical sensor according to the second preferred embodiment of the present invention.

FIG. 11 illustrates a configuration of an optical sensor 1C according to a modification to the second preferred embodiment of the present invention. In addition to a configuration the same as or similar to the configuration described in the second preferred embodiment, the optical sensor 1C according to the present modification further includes an optical system 26 such as, for example, a lens configured to guide the detection light L10 emitted from the light source 23 outside the dome 35. For example, the optical system 26 is disposed so that the reflected light L20 is received by the photodetector 32 in the dome 35 when the detection light L10 is reflected at a specific position P2 determined in advance.

As shown in FIG. 11, since the optical system 26 is disposed in the optical sensor 1C according to the present modification, the reflected light L20, which is obtained by reflection of the detection light L10 on the object 5, is received by the photodetector 32 in the dome 35 when the object 5 is located at the specific position P2. In contrast, when the object 5 is not located at the specific position P2, the reflected light L20, which is obtained by reflection of the detection light L10 on the object 5, is not received by the photodetector 32. As in the modification to the first preferred embodiment, the proximity detector 20 according to the present modification is configured to detect whether the object 5 is located at the specific position P2 based on a receive signal from the photodetector 32 representing a result of receiving light.

As described above, in addition to the light source 23, the optical unit outside the dome 35 in the optical sensor 1C according to the present modification further includes the optical system 26 configured to guide the detection light L10 from the light source 23 so that the detection light L10 emitted by the light source 23 is received by the photodetector 32 when reflected at the specific position P2. The proximity detector 20 is configured to detect whether the object 5 is located at the specific position P2 based on the receive signal from the photodetector 32 in response to light emitted by the light source 23. In this way, as in the modification to the first preferred embodiment, proximity detection can also be performed accurately without depending on a parameter such as a reflection coefficient of the object 5.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An optical sensor to detect a force exerted by contact with an object and detect the object being in proximity based on a result of receiving light, the optical sensor comprising:
  a first light source to emit light;
  a first photodetector to receive light and generate a signal representing a result of receiving the light;
  a cover made of an elastic material deformable in response to an external force and covering the first light source and the first photodetector, the cover including a reflective portion that reflects light and a transmissive portion that transmits light;
  a force detector configured to measure a force corresponding to deformation of the cover based on a signal from the first photodetector, the signal representing a result of receiving light emitted by the first light source;
  an optical assembly disposed outside the cover; and
  a proximity detector to detect the object being in proximity by using the optical assembly and one of the first light source and the first photodetector.

2. The optical sensor according to claim 1, wherein
  the optical assembly includes a second photodetector to receive light and generate a signal representing a result of receiving the light; and
  the proximity detector is operable to detect the object being in proximity based on a signal from the second photodetector, the signal representing a result of receiving light emitted by the first light source.

3. The optical sensor according to claim 2, wherein an intensity of light emitted by the first light source is higher when the second photodetector generates a signal representing a result of receiving light emitted by the first light source than when the first photodetector generates a signal representing a result of receiving light emitted by the first light source.

4. The optical sensor according to claim 2, wherein
  the optical assembly includes an optical system to guide light incident on the second photodetector from a predetermined position; and
  the proximity detector is operable to, based on a signal from the second photodetector, detect whether the object is located at the predetermined position.

5. The optical sensor according to claim 1, wherein
  the optical assembly includes a second light source to emit light; and
  the proximity detector is operable to detect the object being in proximity based on a signal from the first photodetector, the signal representing a result of receiving light emitted by the second light source.

6. The optical sensor according to claim 5, wherein an intensity of light emitted by the second light source is higher than an intensity of light emitted by the first light source.

7. The optical sensor according to claim 5, wherein
  the optical assembly includes an optical system to guide light emitted by the second light source such that the light emitted by the second light source is received by the first photodetector when the light is reflected at a predetermined position; and the proximity detector is operable to, based on a signal from the first photodetector in response to light emitted by the second light source, detect whether the object is located at the predetermined position.

8. The optical sensor according to claim 1, wherein the cover has a circular or substantially circular truncated cone shape.

9. The optical sensor according to claim 1, wherein an inside of the cover is hollow.

10. The optical sensor according to claim 1, wherein an inside of the cover is filled with an elastic material or a liquid.

11. The optical sensor according to claim 1, wherein the reflective portion of the cover is made of a reflective resin or metal.

12. The optical sensor according to claim 1, wherein the cover includes a shadow mask, and the light transmissive portion of the cover is defined by an optical window in the shadow mask.

13. The optical sensor according to claim 1, wherein the first light source includes a vertical cavity surface emitting laser.

14. The optical sensor according to claim 1, wherein the first light source includes at least one of a laser diode or an LED.

15. The optical sensor according to claim 1, wherein the first photodetector includes at least one photodiode.

16. The optical sensor according to claim 1, wherein the first photodetector includes at least one of a position sensitive detector, a complementary metal oxide semiconductor image sensor, or a charge-coupled device.

\* \* \* \* \*